United States Patent [19]

Clewett et al.

[11] 4,004,681
[45] Jan. 25, 1977

[54] TILTING TRAY SORTING SYSTEM

[75] Inventors: Merle E. Clewett, Frederick; Seymour Henig, Kensington, both of Md.

[73] Assignee: American Chain & Cable Company, Inc., Bridgeport, Conn.

[22] Filed: Apr. 5, 1976

[21] Appl. No.: 673,793

[52] U.S. Cl. .................... 198/796; 198/365
[51] Int. Cl.² ............................ B65G 47/38
[58] Field of Search ........... 198/38, 155, 157, 158, 198/146; 209/74 R; 214/62 R, 62 A, 149

[56] References Cited

UNITED STATES PATENTS

| | | | |
|---|---|---|---|
| 3,167,192 | 1/1965 | Harrison et al. | 198/38 X |
| 3,265,190 | 8/1966 | Boehm | 198/155 |
| 3,306,428 | 2/1967 | Harrison et al. | 198/38 |
| 3,386,563 | 6/1968 | Harrison | 198/155 |
| 3,463,298 | 8/1969 | Harrison | 198/155 |
| 3,589,501 | 6/1971 | Harrison | 198/155 |
| 3,662,874 | 5/1972 | Muller | 198/155 |
| 3,669,245 | 6/1972 | Wooten et al. | 198/155 |
| 3,848,728 | 11/1974 | Leibrick et al. | 198/155 |
| 3,945,485 | 3/1976 | Speaker | 198/155 |

FOREIGN PATENTS OR APPLICATIONS 665,823  7/1963  Canada .............................. 198/38

*Primary Examiner*—Evon C. Blunk
*Assistant Examiner*—Richard K. Thomson
*Attorney, Agent, or Firm*—Barnes, Kisselle, Raisch & Choate

[57] ABSTRACT

A tilting tray sorting system comprising a plurality of carriages, a track and a conveyor for moving the carriages along the track. Each carriage comprises a tray which is supported on its carriage for swiveling movement about a vertical axis and for tilting movement about a horizontal axis. The tray is normally held in generally horizontal position on the carriage. Actuators are provided along the path of the carriages and engage and move the trays such that they swivel about a vertical axis and tilt about a horizontal axis to deliver an article to one or more delivery positions along the path of the carriages. Reset devices are provided along the path of the carriages downstream of the delivery positions for returning the trays to their normal position.

37 Claims, 5 Drawing Figures

TILTING TRAY SORTING SYSTEM

This invention relates to tilting tray sorting systems for conveying and sorting articles such as packages, case goods, luggage, and the like.

BACKGROUND OF THE INVENTION

In tilting tray sorting systems, a plurality of trays are mounted on a conveyor and moved successively to spaced delivery stations where the trays are selectively tilted about longitudinal axes of the conveyor to deliver the articles to the spaces or destinations.

One of the problems with such systems is that substantial distance along the path of the conveyor is required to permit the tilting of a tray and the discharge of an article. This distance is commonly termed a window. Because of the time involved in tilting a tray and the speed of movement of the conveyor, the window size is necessarily at least equal to the size of the article being delivered plus the distance traversed by the tray during the time period that the article is passing over the edge of the tray. As a result, it has been necessary to space the delivery stations including chutes or slides for receiving the articles at greater distances from one another.

Accordingly, an object of the invention is to provide a tilting tray sorting system which has a reduced window size permitting an increased number of sorting stations in any given length; wherein the system includes a mechanism for reducing the forward traverse distance of the article during the critical time period of delivery; and which mechanism is relatively simple in construction, resulting in reduced manufacturing costs.

SUMMARY OF THE INVENTION

In accordance with the invention, the tilting tray sorting system comprises a plurality of carriages for supporting the trays wherein each carriage supports its tray for swiveling movement about a vertical axis and for tilting movement about a horizontal axis. The tray is normally held in generally horizontal position on the carriage. Actuator means are provided along the path of the carriages for engaging and moving the trays such that they swivel about the vertical axis and tilt about the horizontal axis to deliver an article to one or more delivery positions along the path of the carriages. Reset means are provided along the path of the carriages downstream of the delivery stations for returning the trays to their normal position.

DESCRIPTION

Figure 1:
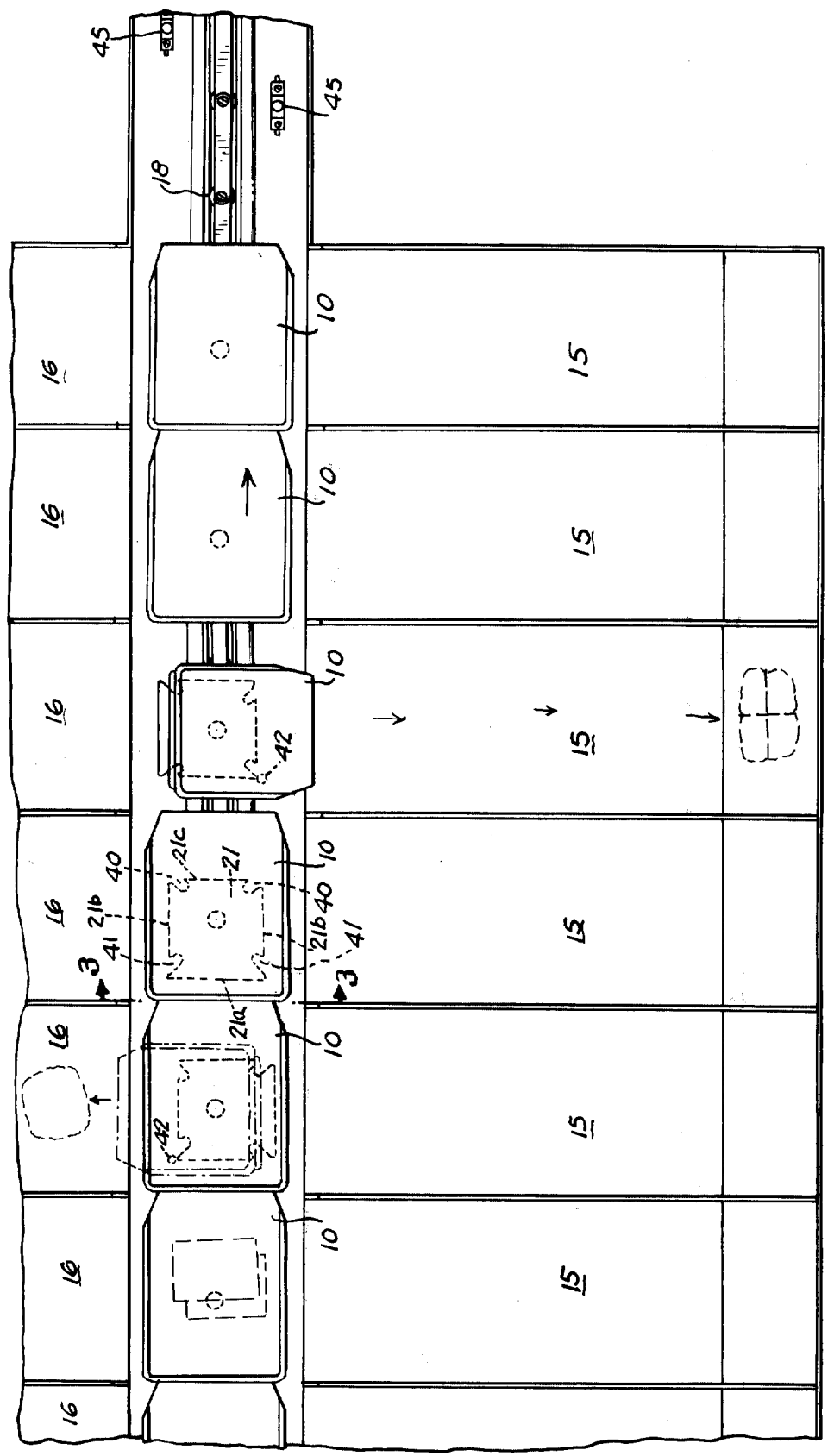
FIG. 1 is a fragmentary plan view of a tilting tray sorter system embodying the invention.
Figure 2:
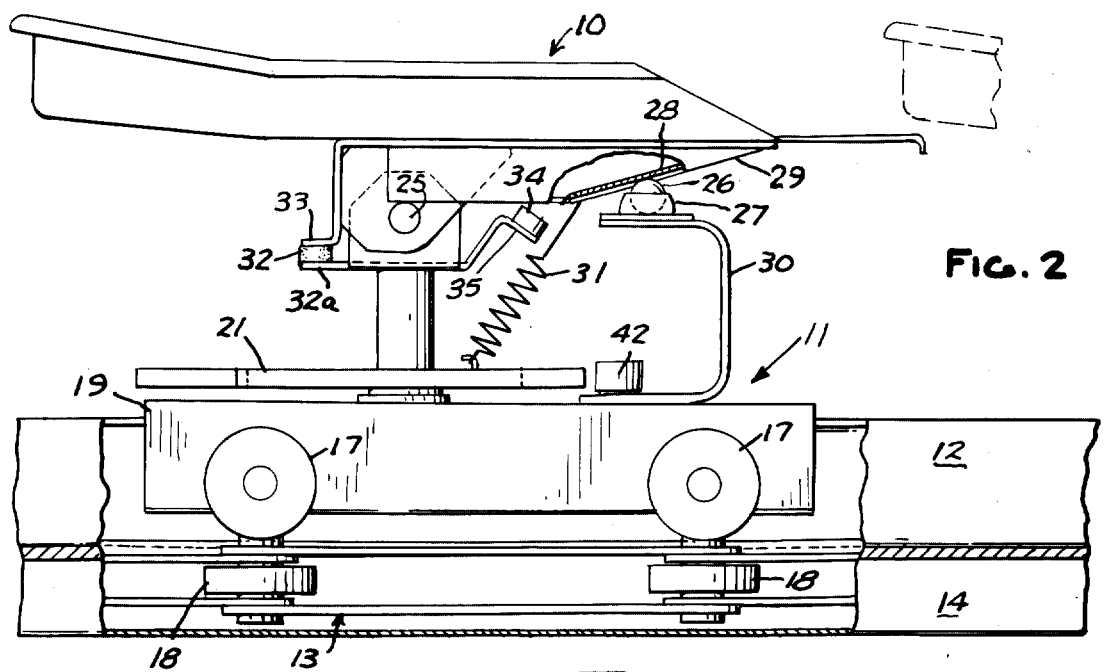
FIG. 2 is a longitudinal sectional elevational view of a portion of the system on an enlarged scale.
Figure 4:
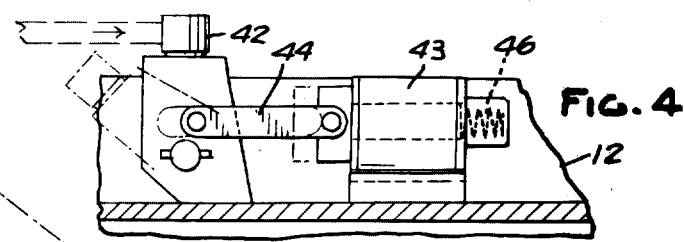
FIG. 4 is a fragmentary sectional view taken along the line 4—4 in FIG. 5.
Figure 3:
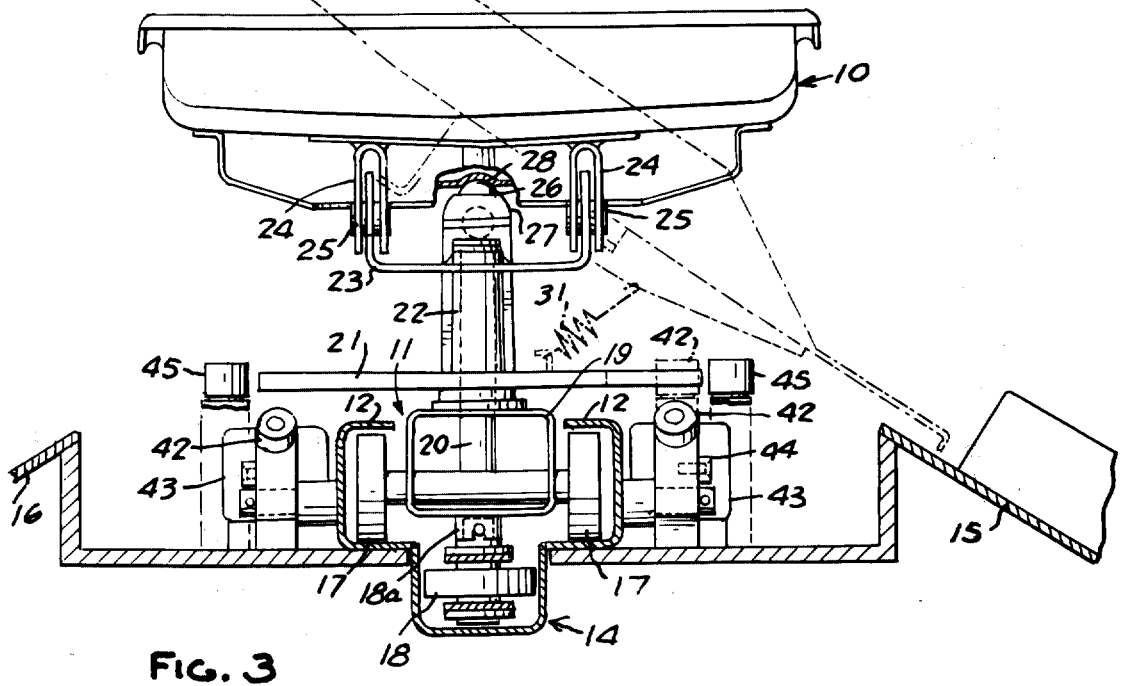
FIG. 3 is a sectional view on an enlarged scale taken along the line 3—3 in FIG. 1.
Figure 5:
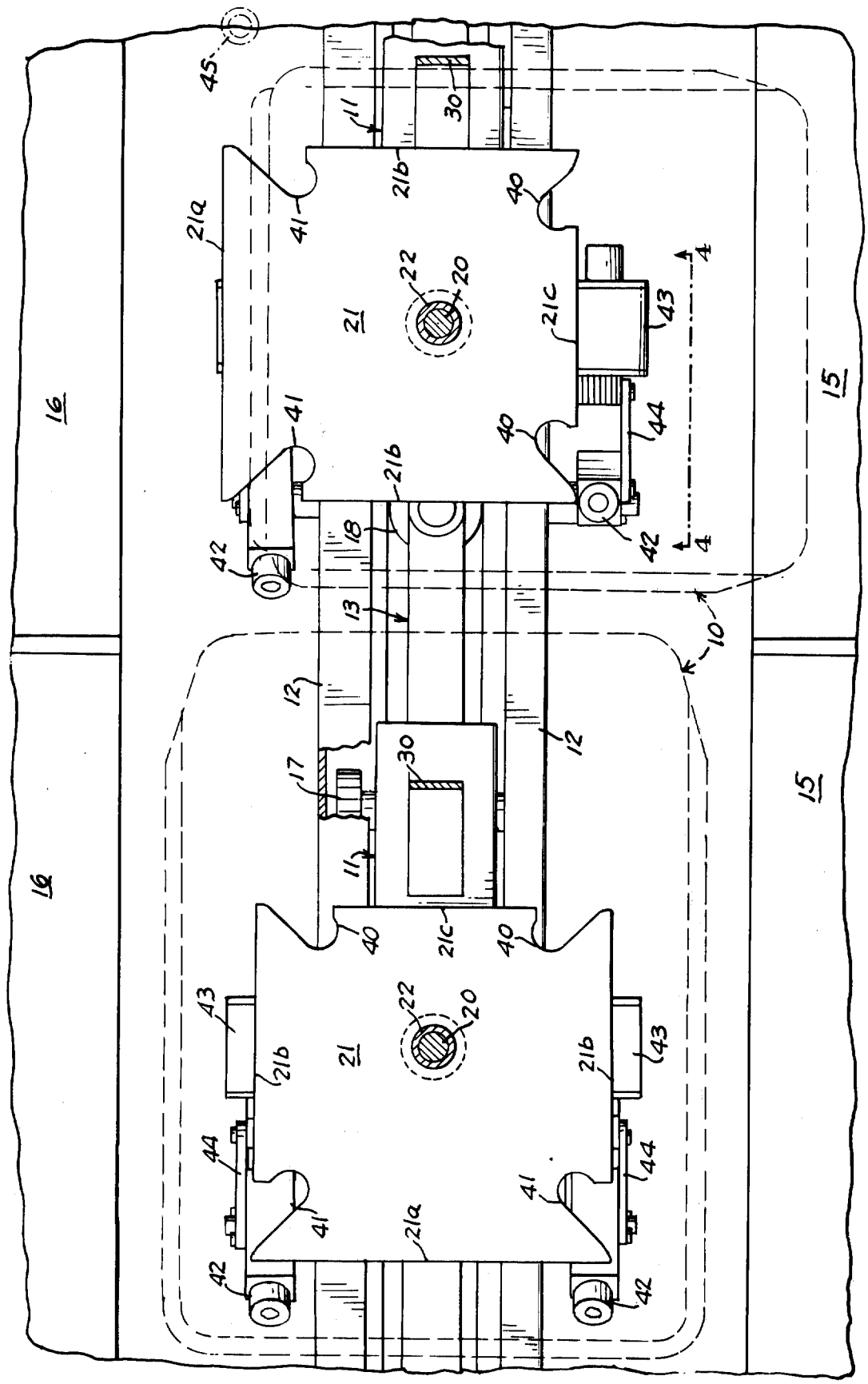
FIG. 5 is a fragmentary plan view on an enlarged scale of a portion of the apparatus shown in FIG. 1, parts being broken away.

Referring to FIGS. 1 and 2, the tilting tray sorting system embodying the invention comprises a plurality of trays 10, each of which is supported on a carriage 11 movable on a track 12, formed by channels, by a connection to a conveyor chain 13 operating in a conveyor track 14. Means are provided, as presently described, to support the tray 10 for swiveling movement about a vertical axis and for tilting movement about a horizontal axis. As a tray 10 reaches the desired predetermined delivery position or station, the tray is rotated and tilted to deliver the article thereon to chutes or slides 15 or 16, as the case may be.

Conveyor chain 13 is representative of various conventional driving means such as (1) this chain in closed-loop form with motor driven sprocket(s) and idler(s), or (2) motor-driven friction caterpillars which propel — also in closed-loop form — interlinked carriages to which friction pads are attached, or (3) a systen analogous to an electric railway where one or several carriages linked to a traction-motor (locomotive) make up a train so that numbers of trains may operate as needed on an open-loop form track.

The carriage 11 is supported by wheels 17 and guided laterally by rollers 18 on the conveyor. A connection 18a provides a connection to the conveyor chain 13. The carriage 11 includes a tubular body 19 on which a fixed vertical shaft 20 is mounted. A tubular shaft 22 having a star wheel 21 fixed to the lower end thereof is rotatably mounted on the shaft 20. A bracket 23 is fixed on the upper end of the shaft 22 and has upstanding arms which extend between spaced U-shaped brackets 24 on the underside of the tray 10. The arms of bracket 23 are pivoted to brackets 24 by pins 25 so that the tray 10 is thus swivelly mounted for movement about the axis of shaft 20 and mounted for tilting movement about the horizontal axis defined by the pivot pins 25. A follower 26 provided in a retainer 27 is adapted to engage a detent depression 28 in a wall 29 on the underside of the tray 10 to hold the tray 10 in normal position. When the tray 10 is tilted, as presently described, the follower 26 continues to contact the cam surface or wall 29 to control the movement of the tray for tilting during rotation. The surface of the wall 29 is preferably generally conical in configuration, that is, it forms part of a cone having a vertical axis. Retainer 27 is mounted on a bracket 30 fixed on the carriage body 19.

A spring 31 yieldingly urges the tray toward the follower 26. In order to limit the tilt and absorb any shock that may be involved during the tilting or returning of the tray, a bumper 32 is provided on a tab 32a of bracket 23 and is adapted to be engaged by a projection 33 on the tray in the normal position and a bumper 34 is provided on another tab 35 and is adapted to be engaged by the underside of the tray when the tray is tilted. The cam surface of wall 29 and follower 26 are set at a level relative to the tilt axis such that the tray is supported in a horizontal attitude when at the center or detent point of its swivel arc, is free of support by the follower 26 at either end of this arc coincident with maximum tilt and is constrained to tilt according to the arcuate position at points intermediate the detent point and the maximum tilt positions.

As shown in FIG. 1, the star wheel 21 is formed with notches or slots 40, 41 along the sides thereof and is dimensioned such that the rear notches 41 extend radially a greater distance from the swivel center than do the front notches 40. The notches are adapted to be engaged by drivers or actuators 42 mounted at the delivery positions or stations along the path of the conveyor. Actuators 42 are movable by a solenoid 43 through a linkage 44 into and out of the path of the notches 40. In order to return the tray to its original position, fixed drivers 45 are provided along the sides for engaging with the slots 41.

In operation, the control of delivery of articles is under a controller such as a digital signal/analog memory controller which receives distribution signals and sends discharge signals to the actuators 42 to deliver the articles to the proper delivery locations or windows. Upon receipt of a signal, the actuator 42 is moved into position so that it will engage the slot 40 of the star wheel 21. As the actuator contacts the rear of the slot, the star wheel 21 is subjected to a turning moment by the swivel shaft exerting a conveying force at the center and by the structurally grounded actuator 42 providing an offset opposing force at the side. The moment first over-forces the follower 26 out of detent 28 and then continues for about 90° during which the actuator 42 bears on the side of the slot 40 causing the star wheel 21 to turn toward the actuator 42. In the latter part of the 90° rotation, the star wheel slot 40 moves laterally away from and out of contact with the actuator 42. In proceeding through this turn, the star wheel 21 with its shaft and trunnions carries the tray 10 through the same turn, but the front of the tray is also caused to tilt downwardly by the spring force which holds the cam surface 29 against the follower 26. In this manner, by swiveling backwards while tilting, the front or discharge end of the tray is provided with an extended period at its window to discharge the article. The star wheel actuator 42 is immediately retracted upon exiting from the slot 40 of the star wheel by the action of the spring 46, the solenoid 43 having been de-energized.

The actuated tray is stable in its swiveled and tilted condition because the tendency to swivel back is opposed by the cam to follower spring force. Thus, the front edge 21c and back edge 21a of the star wheel 21 are now parallel to the path of the carriage. Since the back edge 21a extends farther from the swivel center than the front edge 21c, the back of the star wheel sweeps a comparatively wide path alongside the track, this path being wider than that of the distance between the side edges 21b of the star wheel 21 before tray actuation.

At one or more locations further along the track as may be desired after a set of delivery windows, the reset devices or drivers may be positioned. These reset drivers 45 are fixed and positioned along both sides of the track and are preferably staggered rather than being directly opposite each other. The reset drivers 45 are spaced laterally from the track at a distance where they will interfere with the back edge 21a of a laterally facing star wheel and engage a slot 41 but will clear the side edges 21b of a front facing star wheel.

When a previously actuated tray with its lateral facing star wheel 21 proceeds to pass a pair of reset drivers 45, one of these enters the star wheel's first approaching back corner slot 41 and, in the same manner as an actuator driver 42, the star wheel 21 and its coupled cam and tray 10 are caused to swivel 90°, except this time rotation is reverse. The tray 10 through its cam surface 29 is driven up by moving against the relatively stationary follower 26 against the force of spring 31; and after the 90° swivel when the tray again is level and facing forward, the follower 26 engages the detent depression 28. During this rotation, the corner of the star wheel 21 diagonally opposite the driven corner will not interfere with the non-working driver because the two drivers are staggered enough to avoid such interference.

In the case of trays not previously actuated, the reset drivers 45 are spaced widely enough apart so that the side edges 21b pass between drivers 45 without contact, and so thus have no effect on these trays.

The tray is stable in its level forward facing condition without need for any latching mechanism other than the detent structure because laterally unbalanced loads can react only against the pivots 25 which provide continuous lateral support to the tray, because such loads can only add to detent holding force which prevents inadvertent swiveling and because tilting cannot occur without swiveling.

In this discharge system, laterally displaced loads cannot be catapulted when trays are tilted to the opposite side of displacement. The back end of the tray starts its rise slowly relative to the progress of swiveling so that rearward load displacement also does not cause catapulting.

We claim:

1. In a tilting tray sorting system, the combination comprising
   a plurality of carriages,
   a track,
   a driving means for moving said carriages along said track,
   each said carriage comprising a tray,
   means for supporting said tray on its carriage for swiveling movement about a vertical axis and tilting movement about a horizontal axis,
   means for holding said tray in normal generally horizontal position on said carriage,
   means along the path of said carriages for engaging and moving said trays such that they swivel about the vertical axis and tilt about the horizontal axis to deliver an article to one or more positions along the path of the carriages,
   and means along the path of the carriages for returning said trays to their normal position.

2. The combination set forth in claim 1 wherein said means for supporting said tray is such that the tray can be swiveled and tilted to either side of the conveyor as it moves in said path.

3. The combination set forth in claim 1 wherein said means for supporting said tray for movement about a vertical axis comprises a shaft fixed to said carriage and a member rotatably mounted on said shaft.

4. The combination set forth in claim 3 wherein said means for supporting said tray for movement about a horizontal axis comprises a bracket mounted on said rotatable shaft and means for pivoting said bracket to the underside of said tray about a horizontal axis.

5. The combination set forth in claim 4 wherein said means for holding said tray in normal generally horizontal position comprises a detent on said carriage and a depression on said tray engaging said detent.

6. The combination set forth in claim 5 wherein said means for swiveling and tilting said tray includes means for guiding said tray between a normal position and a position in tilted rotated relation to the carriage.

7. The combination set forth in claim 6 wherein said last-mentioned means comprises a surface of revolution on said tray and a follower on said carriage.

8. The combination set forth in claim 7 wherein said surface includes a recess, said follower engaging said recess to hold said tray in normal position.

9. The combination set forth in claim 8 including means yieldingly urging said tray toward said follower.

10. The combination set forth in claim 3 wherein said means for engaging said tray to swivel and tilt the tray comprises a star wheel mounted on said first-mentioned shaft and having a plurality of notches therein, and a member mounted along the path and movable into position for engagement with a notch to rotate said star wheel and thereby rotate said tray.

11. The combination set forth in claim 10 wherein said means for returning said tray comprises a member along the path of said trays engageable with another notch of said star wheel to return said star wheel to the original position.

12. The combination set forth in claim 11 wherein said star wheel is rectangular and said notches are positioned at the corners of the rectangular star wheel.

13. In a tilting tray sorting system, the combination comprising
a plurality of carriages,
a track,
a conveyor for moving said carriages along said track,
each said carriage comprising a tray,
means for supporting said tray on its carriage for swiveling movement about a vertical axis and tilting movement about a horizontal axis,
means for holding said tray in a normal generally horizontal position on said carriage,
said means for swiveling and tilting said tray comprising means for supporting said tray for movement about a vertical axis and means for supporting said tray for movement about a horizontal axis,
said means for swiveling and tilting said tray includes means for guiding said tray between said normal position and a position in tilted rotated relation to the carriage,
means along the path of said carriages for engaging said means for supporting said tray for movement about a vertical axis and moving said trays such that they swivel about the vertical axis and tilt about the horizontal axis to deliver an article to one or more positions along the path of the carriages,
and means along the path of the carriages for returning said trays to their normal position.

14. The combination set forth in claim 13 wherein said means for supporting said tray is such that the tray can be swiveled and tilted to either side of the conveyor as it moves in said path.

15. The combination set forth in claim 14 wherein said means for mounting said tray for movement about a vertical axis comprises a shaft fixed to said carriage and a member rotatably mounted on said shaft.

16. The combination set forth in claim 15 wherein said means for mounting said tray for movement about a horizontal axis comprises a bracket mounted on said rotatable shaft and means for pivoting said bracket to the underside of said tray about a horizontal axis.

17. The combination set forth in claim 16 wherein said means for holding said tray in normal position comprises a follower on said carriage and a depression on said tray engaging said follower.

18. The combination set forth in claim 17 wherein said means for guiding said tray comprises a surface of revolution on said tray engaged by said follower on said carriage.

19. The combination set forth in claim 18 wherein said depression is on said surface.

20. The combination set forth in claim 19 including means yieldingly urging said tray toward said follower.

21. The combination set forth in claim 20 wherein said means for engaging said tray to swivel and tilt the tray comprises a star wheel mounted on said first-mentioned shaft and having a plurality of notches therein, and a member mounted along the path and movable into position for engagement with a notch to rotate said star wheel and thereby rotate said tray.

22. The combination set forth in claim 21 wherein said means for returning said tray comprises a member along the path of said trays engageable with another notch of said star wheel to return said star wheel to the original position.

23. The combination set forth in claim 22 wherein said star wheel is rectangular and said notches are positioned at the corners of the rectangular star wheel and extend diagonally.

24. The combination set forth in claim 23 wherein said star wheel, when in its normal position and said tray is in its normal position, has a rear edge longer than the width of the star wheel between its side edges and a front edge shorter than the width of the star wheel between its side edges.

25. In a tilting tray sorting system, the combination comprising
a carriage adapted to be moved in a predetermined path and comprising a tray,
means for supporting said tray on its carriage for swiveling movement about a vertical axis and tilting movement about a horizontal axis,
means for holding said tray in normal generally horizontal position on said carriage,
means adapted to be mounted along the path of said carriage for engaging and moving said tray such that it swivels about the vertical axis and tilts about the horizontal axis to deliver an article to one or more positions along the path of the carriage,
and means adapted to be mounted along the path of the carriage for returning said tray to its normal position.

26. The combination set forth in claim 25 wherein said means for supporting said tray is such that the tray can be swiveled and tilted to either side as it moves in a path.

27. The combination set forth in claim 25 wherein said means for mounting said tray for movement about a vertical axis comprises a shaft fixed to said carriage and a member rotatably mounted on said shaft.

28. The combination set forth in claim 27 wherein said means for mounting said tray for movement about a horizontal axis comprises a bracket mounted on said rotatable shaft and means for pivoting said bracket to the underside of said tray about a horizontal axis.

29. The combination set forth in claim 28 wherein said means for holding said tray in normal position comprises a detent on said carriage and a depression on said tray engaging said detent.

30. The combination set forth in claim 29 wherein said means for swiveling and tilting said tray includes means for guiding said tray between said normal position and a position in tilted rotated relation to the carriage.

31. The combination set forth in claim 30 wherein said last-mentioned means comprises a surface of revolution on said tray and a follower on said carriage.

32. The combination set forth in claim 31 wherein said surface includes a recess, said follower engaging said recess to hold said tray in normal position.

33. The combination set forth in claim 32 including means yieldingly urging said tray toward said follower.

34. The combination set forth in claim 33 wherein said means for engaging said tray to swivel and tilt the tray comprises a star wheel mounted on said first-mentioned shaft and having a plurality of notches therein, and a member mounted along the path and movable into position for engagement with a notch to rotate said star wheel and thereby rotate said tray.

35. The combination set forth in claim 34 wherein said means for returning said tray comprises a member adapted to be mounted along the path of said trays engageable with another notch of said star wheel to return said star wheel to the original position.

36. The combination set forth in claim 35 wherein said star wheel is rectangular and said notches are positioned at the corners of the rectangular star wheel and extend diagonally.

37. The combination set forth in claim 36 wherein said star wheel, when in its normal position and said tray is in its normal position, has a rear edge longer than the width of the star wheel between its side edges and a front edge shorter than the width of the star wheel between its side edges.

* * * * *